Dec. 6, 1932.  R. F. HALL  1,890,035
AIRPLANE
Filed Oct. 24, 1929  2 Sheets-Sheet 1
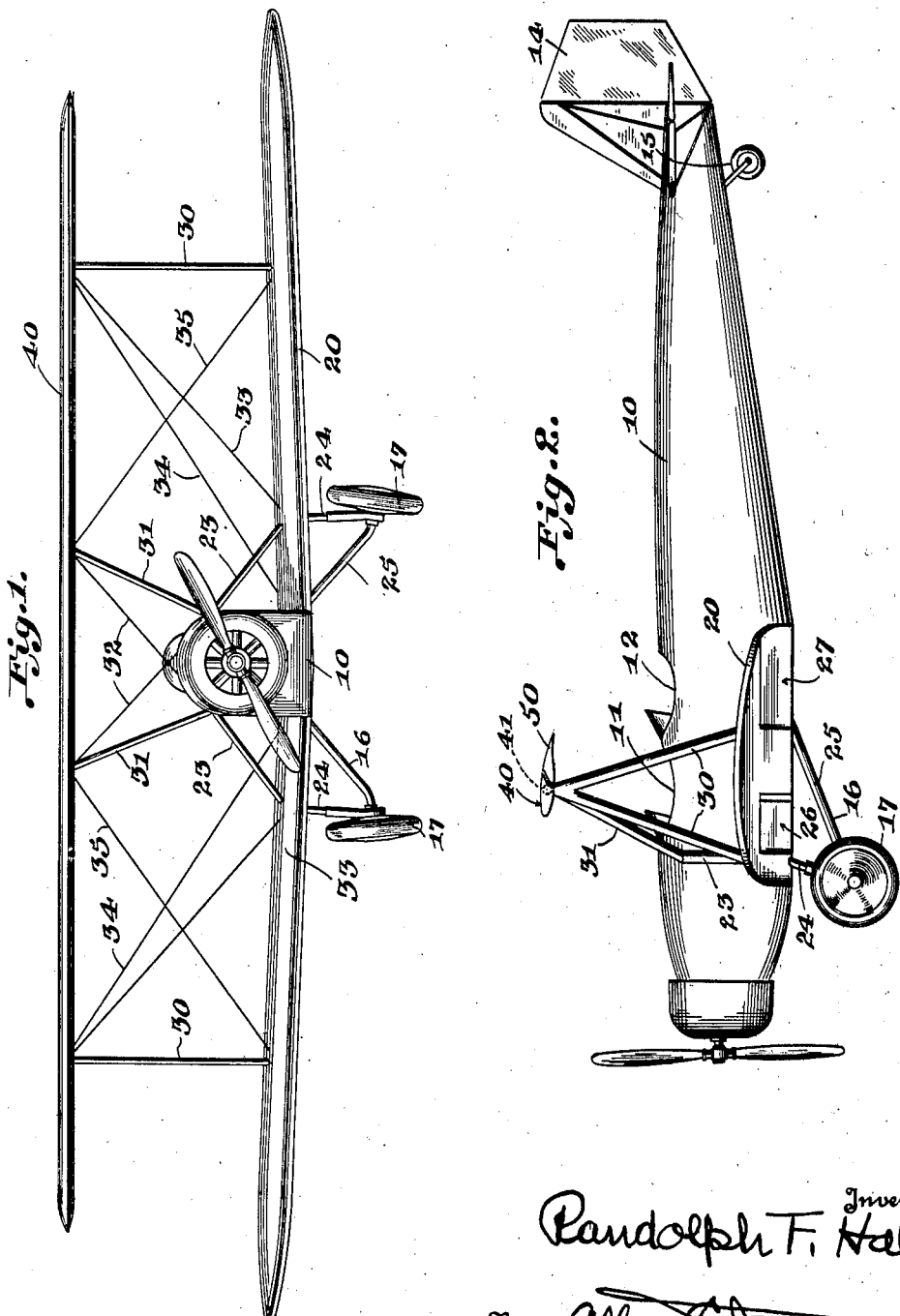

Dec. 6, 1932.  R. F. HALL  1,890,035
AIRPLANE
Filed Oct. 24, 1929  2 Sheets-Sheet 2
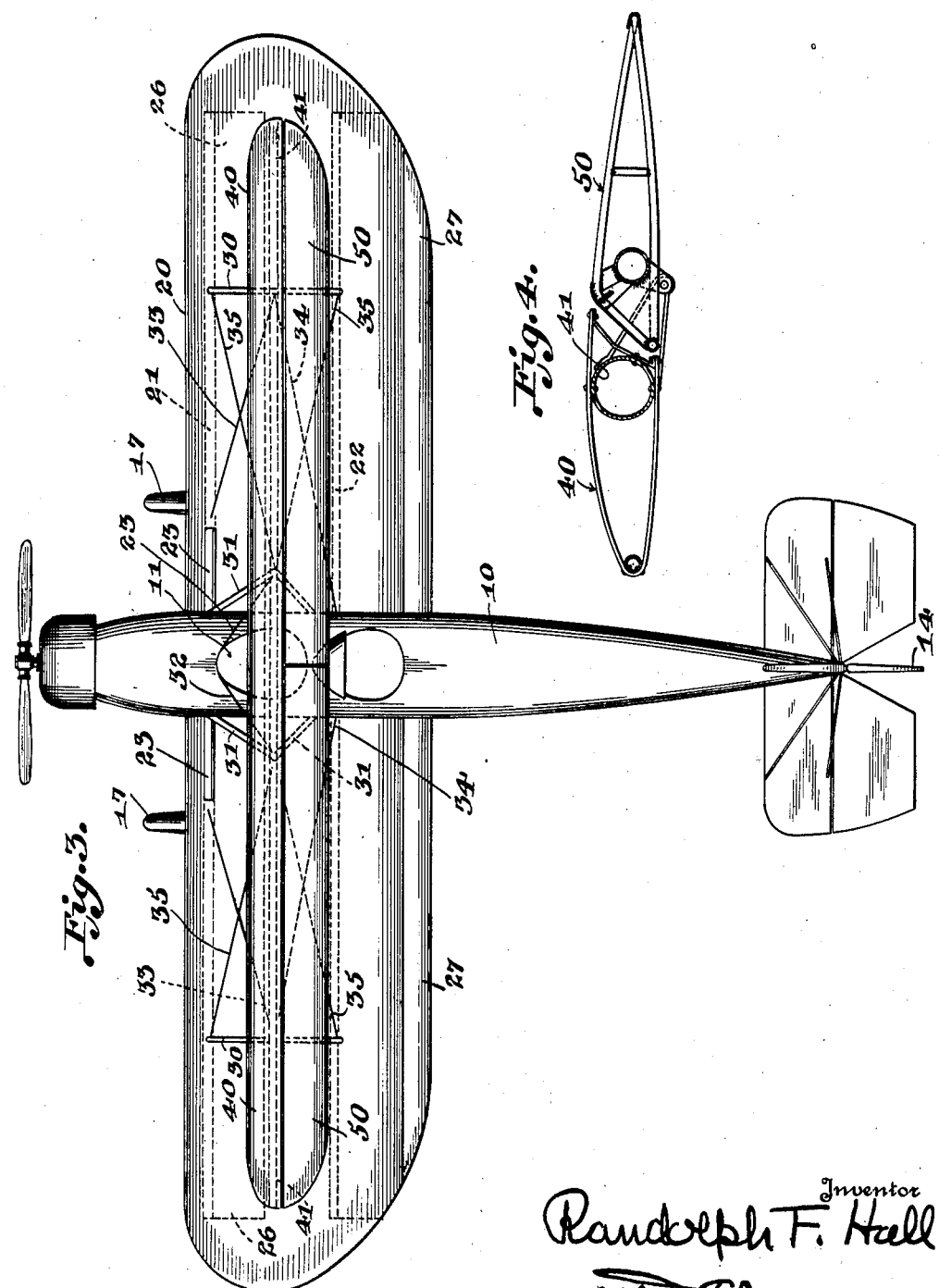

Patented Dec. 6, 1932

1,890,035

UNITED STATES PATENT OFFICE

RANDOLPH F. HALL, OF ROCHESTER, NEW YORK

AIRPLANE

Application filed October 24, 1929. Serial No. 402,068.

This invention relates to certain improvements in airplanes; and the nature and objects of the invention will be readily recognized and understood by those skilled in the aeronautical art, in the light of the following explanation and detailed description of the accompanying drawings illustrating what I now believe to be the preferred embodiments or aerodynamical and mechanical expressions of my invention from among various other forms, arrangements, designs, combinations and constructions of which the invention is capable within the spirit and the scope thereof.

The monoplane type of airplane wing possesses certain well known aerodynamical and design advantages over the biplane or multiplane type of airplane wing cellule. The so-called "low wing" type of monoplane wing in particular permits of obtaining highly desirable aerodynamic and design results not appreciably or practically possible of attainment with airplane designs utilizing either the so-called "high wing" type of monoplane wing or the biplane or multiplane type of wing cellule. Among the more important of such "low wing" advantages and results are, the materially increased vision upwardly and forwardly and rearwardly, afforded the pilot and/or other occupants of the airplane; and the reduced landing speed of the airplane as the result of the "ground" or "cushioning" effect of the air between the "low wing" of the monoplane type, with its relatively large area, and the ground, in landing with the airplane.

However, the monoplane type of wing, both the "low wing" and the "high wing", has certain inherent disadvantages, particularly structural, in that such type lacks a high degree of rigidity, especially torsional rigidity. These structural disadvantages are inherent in the type, mainly because of the difficulties of and limitations on, providing efficient external bracing and trussing for such type of wing. On the contrary, the biplane or multiplane type of wing cellule possesses relatively high structural strength and great rigidity, including the highly desirable torsional rigidity, primarily due to the fact that such type can be efficiently externally braced and trussed, including interplane bracing and trussing.

My present invention holds as a general object the provision of a design and arrangement of an airplane wing cellule characterized by the fact that the advantages of the "low wing" type of monoplane wing, namely, increased visibility and reduced landing speed, are secured; while the advantages of the biplane type of wing cellule, namely, strength and rigidity with the use of external and interplane bracing and trussing, are also obtained, but without material impairment of visibility and with the substantial elimination or material reduction of the hereinbefore referred to disadvantages of both the monoplane and the biplane types.

The invention is further characterized by the provision of a design and arrangement of wing cellule having the above mentioned attributes, in which a "low wing" type of monoplane wing forms the lower and main wing of the cellule, while the upper wing of the cellule is formed with a very high aspect ratio based on a wing chord which is very small with respect to the chord of the main lower wing, with the objects in view of securing from the upper, high aspect ratio wing an efficient contribution to the total lift developed by the cellule; and further to enable the use of external and interplane trussing and bracing for and between the upper and lower wings with resulting strength and rigidity for the cellule, including torsional rigidity for the "low wing" monoplane type of main lower wing, as well as for the cellule as a unit, but without materially reducing the visibility afforded by the "low wing" type of monoplane lower wing of the cellule.

A characteristic of the invention which contributes to the retention of the "low wing" visibility and which enables the formation of the cellule with the upper, high aspect ratio wing, resides in the design, construction and relative mounting of the upper and lower wings, together with an arrangement and design of the external and interplane bracing and trussing by which the required strength and rigidity are obtained with minimum weight and low head resistance offered by the bracing and trussing, and a minimum impairment or reduction of the visibility derived from the use of the "low wing" monoplane type of lower main wing of the cellule.

A further feature of the invention is the employment of a "low wing" monoplane type of lower main wing for the cellule, of the so-called "high lift" types utilizing vanes, flaps, or auxiliary airfoils, and/or slots or air displacement passages through the medium of which the lift of the wing is maintained or increased under certain conditions of flight; and an object of the invention is to so locate and mount the ailerons or lateral control surfaces for the cellule that they will not interfere with the function and operation or reduce the efficiency of the "high lift" type of lower main wing through a reduction in its lift, particularly under certain conditions such as the condition of "stall".

A further characteristic of the invention resides in locating and mounting the ailerons or lateral control surfaces for the cellule on the high aspect ratio upper wing of the cellule, so that they are in position removed from the lower wing, and when the lower wing is of the so-called "high lift" type such ailerons or lateral control surfaces will not interfere with the functioning or reduce the efficiency of such "high lift" lower wing when operating, but which ailerons or control surfaces are so designed and mounted relative to the upper and lower wings of the cellule that the visibility afforded by the "low wing" type lower main wing is not materially impaired, or the other advantages previously referred to detracted from.

With the foregoing general objects, characteristics and results, as well as certain others in view, which will be apparent from the explanation to follow, the invention consists in certain novel features in construction and in design, arrangement and combination of elements and parts thereof, as will be more fully and particularly referred to and pointed out hereinafter.

Referring to the accompanying drawings:

Fig. 1 is a view in front elevation of an airplane embodying and incorporating a wing cellule of the invention.

Fig. 2 is a view in side elevation of the airplane of Fig. 1, showing particularly the arrangement of "low wing" monoplane "high lift" type lower wing and high aspect ratio upper wing of the cellule mounting the ailerons, together with the interplane struts of the cellule.

Fig. 3 is a top plan view of the airplane and wing cellule of Figs. 1 and 2, showing the ailerons mounted on the upper wing, and further showing, partially in dotted lines, the design and arrangement of the external and interplane trussing and bracing and the upper and lower wing beams.

Fig. 4 is a sectional view, more or less diagrammatical, through the upper high aspect ratio wing of the cellule with the aileron location and mounting thereon, and showing the single rear beam wing design.

An airplane incorporating a wing cellule embodying the principles and features of the invention is illustrated in the accompanying drawings, but it is to be clearly understood that the specific embodiment of a wing cellule of the invention here shown is by way of an example only for the purpose of explaining the invention so that those skilled in the aeronautical art will understand the same, and is not shown by way of limitation to the exact and specific construction and arrangement of such particular aerodynamical and mechanical expression of the invention. Obviously various other arrangements, designs and constructions of a wing cellule embodying the broad principles and several features of the invention and securing the desired advantages and results, can be utilized in carrying out and applying the invention, and the invention contemplates and includes all such other designs, arrangements and construction, and this disclosure and explanation set forth herein is to be so construed and interpreted.

In the illustrated example of a possible design and arrangement of a wing cellule in accordance with the invention, referring now to the accompanying drawings, the airplane includes a usual or any desired body or fuselage 10 formed with the open cockpits 11 and 12 therein, in the conventional manner (see Figs. 2 and 3). The invention however, is not restricted to use with airplanes of the open cockpit type but is applicable to those using various other types of bodies either of the open or the closed and cabin types. The body or fuselage 10 carries the tail assembly or empennage 14 and the tail element of the landing gear such as the tail wheel 15 (see Fig. 2). A landing carriage or chassis 16 of the so-called "split" axle type is provided and includes the usual landing wheels 17, together with suitable braces and trusses to be described in detail hereinafter. Attention is called to the fact that while a wing cellule of the invention is here shown as applied to an airplane of the land type, it is also applicable to airplanes of the water types, as well as to those of the combined land and water types. Further, wing cellules of the invention are also adapted to use with and incorporation in airplane designs employing an outrigged empennage with a nacelle or other type of body, than the fuselage type of the example hereof.

In accordance with the teachings of the invention as exemplified by the embodiment presented herein, a wing cellule includes a lower and main wing 20 of the "low wing" monoplane type, and an upper wing 40 of a high aspect ratio having a span slightly less than the span of main wing 20 and a small chord with respect to the chord of the lower main wing. In the present instance, although the invention is not so limited, the chord of the upper, high aspect ratio wing 40, including ailerons or lateral control surfaces mounted thereon, is approximately one-third (⅓) the chord of the lower and main wing 20. The aspect ratio of the upper wing 20 in the example hereof, is approximately (13), although the invention is not restricted to any specific aspect ratio.

The lower wing 20 which is of the "low wing" monoplane type and forms the main supporting surface or wing for the airplane is mounted in any suitable manner on and to and extends from opposite sides of the fuselage 10, at and adjacent the lower side thereof (see Figs. 1 and 2) in the usual location for the "low wing" type of monoplane wing to secure the desired "ground" of "cushioning" effect with the resulting reduction in landing speed, as well as to secure the increased visibility from the body cockpits 11 and 12. The construction of the wing 20 is such that it includes the forward spar or wing beam 21 and the rear spar or wing beam 22, shown by dotted lines in Fig. 3 of the drawings, together with suitable internal bracing and trussing (not shown) by which the wing will carry chordwise direction loads. The wing 20 is braced by suitable struts or braces 23 from opposite sides of the fuselage 10, which extend downwardly and outwardly to and are connected with and into the forward wing beam 21.

The chassis 16 includes the V-trusses 25 for each wheel 17, which trusses are secured at their upper diverged ends to the forward and rear wing beams 21 and 22, respectively, at the under side of wing 20 near the body, and the brace or strut 24, which strut extends upwardly, to the front wing beam 21 (see Fig. 1). The design and arrangement of the chassis 16 may be varied to meet the requirements of each particular design and type of airplane into which the wing cellule is to be incorporated, without departing from the invention.

In the present example of a wing cellule of the invention, the lower and main wing 20 is of the so-called "high-lift" type, and specifically is of the "Hall" type of U. S. Letters Patents 1,559,091 and 1,723,778. This "Hall" type wing 20 includes as a part of the under surface thereof a forward vane 26 controlling the inlet end of the air displacement passage, and a rear flap 27 for opening and closing the rear or discharge end of the displacement passage, which rear flap 27 in lowered, passage opening position extends downwardly from and changes the camber of the wing. (See Figs. 2 and 3 of the drawings.) The forward vane 26 is pivoted along and to the rear of forward wing beam 21, and the rear flap 27 is pivoted on the rear beam 22, extending rearwardly therefrom and a distance beyond the trailing edge of the upper surface of wing 20. The rear flap 27 extends in the example hereof, continuous and unbroken along the span of wing 20 at each side of fuselage 10, as will be clear by reference to Fig. 3 of the drawings.

While the lower and main wing 20 is here shown as of the "Hall" type of "high lift" wing, the invention is not limited to this type, as any other of the well known or other types of "high lift" wings may be employed. It is to be here noted also, that the invention in its broadest phase is not restricted to the use of a "high lift" type of lower and main wing, as such wing may be of the conventional types, and the invention expressly includes a cellule in which no "high lift" type of wing is employed.

The upper, high aspect ratio wing 40 of the cellule, referring particularly to Fig. 4 of the drawings, is of very small chord with respect to its span and to the chord of the lower and main wing 20, and is formed and constructed in its preferred form to include but a single wing beam 41, which is located and disposed at and along the rear or trailing edge thereof. In the embodiment of cellule hereof, the upper wing 40 is formed as a continuous wing having a span slightly less than the span of the main wing 20, and is mounted in position disposed above and extending across fuselage 10, in the present instance above forward cockpit 11, intermediate the leading and trailing edges of lower wing 20. The upper wing 20 may, however, if desired be formed in sections instead of continuous, or may be formed with a center section.

An arrangement of external and interplane bracing and trussing is provided by the invention for and between the upper and lower wings 20 and 40, by which the cellule of high strength factor and rigidity, including torsional rigidity, is secured, and all in an efficient manner. The cellule is provided with the outer interplane trusses 30 of inverted V type which are secured between the outer ends of the upper and lower wings, with their converged upper ends connected with the single beam 41 of upper wing 40, and their diverged spaced lower ends connected with the forward and rear beams 21 and 22, respectively of the lower wing 20 (see Figs. 2 and 3 in particular). At each side of the fuselage 10, an inverted V strut 31 is positioned attached at its lower diverged ends into the fuselage side structure with the forward leg thereof attached at the point of attachment of the adjacent lower wing brace or strut 23 with the fuselage. These V struts 31 extend upwardly and outwardly to the upper wing 40 and are connected thereto at the under side thereof to the single beam 41 of the upper wing. These struts 31 at opposite sides of the fuselage 10, thus form supporting and load carrying trusses for the center portion or section of the upper wing 40, and in addition crossed brace wires 32 (see Figs. 1 and 2) are provided extending from the fuselage at the upper side thereof, upwardly and outwardly to the upper ends of struts 31 and the upper wing beam 41.

The bracing and trussing for the cellule is completed by the flying wires 33 and 34, and the landing wires 35, extending between the upper and lower wings 40 and 20, at opposite sides of the fuselage 10. The flying wires 33 and 34 at each side of the fuselage are connected at their upper ends to the upper wing beam 41 at the point of attachment of the converged upper end of inverted V strut 30 with such beam, and wire 33 extends downwardly, inwardly and forwardly to the forward beam 21 of lower wing 20 adjacent the lower end of brace strut 23, while wire 34 extends downwardly, inwardly and rearwardly to and connected with the adjacent side of fuselage 10. (See Figs. 1 and 3.) The landing wires 35 for the cellule at each side of fuselage 10, are connected at their upper ends to the point of attachment of the center section strut 31 with the upper wing beam 41, and diverge downwardly and outwardly to the lower ends of the outer inverted interplane V strut 30, and are attached to the forward and rear beams 21 and 22, respectively, adjacent to and at the points of attachment of the lower diverged ends of strut 30 with the beams 21 and 22. (See Figs. 1 and 3.)

A design, arrangement and construction of wing cellule is thus produced in which the main wing is formed by the "low wing" monoplane type of lower wing 20 with its advantage of reduced landing speed for the airplane, and its advantage of increased visibility, but in which the structural disadvantages of this type of wing are eliminated by the high aspect ratio upper wing 40 with the external and interplane bracing and trussing forming with the wing 20 and wing 40 a cellule in which strength and rigidity are given the main monoplane type wing 20, and especially torsional rigidity, as well as imparted to the cellule as a unit. Due to the very small chord of the high aspect ratio upper wing 40 the increased visibility of the lower main monoplane type wing 20 is not materially impaired, and the design of this upper wing with its single main beam maintains minimum weight, while the wing is aerodynamically efficient with its high aspect ratio to contribute to the lift developed by the cellule and enable a reduction in proportions of the airplane. The cellule bracing and trussing utilizing the V struts permitted by the wing beam arrangements of the upper and lower wings, is of clean, minimum resistance and low weight design and construction giving a maximum of strength and rigidity for the cellule with a minimum of structure.

The invention provides for the location and mounting of suitable ailerons or lateral control surfaces on and carried by the upper high aspect ratio wing 40 of the cellule, removed from the lower main wing 20. In the example of this feature of the invention here presented, ailerons 50, referring now to Fig. 4 in connection with Figs. 2 and 3 of the drawings, are mounted on and along the trailing or rear edge of wing 40, hingedly or pivotally supported on and from the beam 41 of wing 40 (see Fig. 4). These ailerons 50 in the specific embodiment hereof, extend and are continuous along and throughout the span of the upper wing 40, and form therewith a total upper wing structure of the required high aspect ratio and relatively small chord with respect to the chord of lower main wing 20 (see Figs. 2 and 3). However, if desired the ailerons 50 need not be continuous and the upper wing can be formed with a center section of the fixed wing portion 40 extending between the ailerons 50 in the usual manner. Any of the conventional or other desired aileron operating mechanisms can be employed for controlling these ailerons 50, and it is not here deemed necessary to disclose or describe any of these well known and understood mechanisms. Where as in the present cellule embodiment of the invention, the lower and main monoplane type wing 20, is of the high lift type, the location of the ailerons on the upper wing 40, removes the same from interfering with the efficient functioning of the wing 20, and particularly when such wing includes trailing flap arrangements such as the flap 27 of wing 20 hereof. By the upper wing location of ailerons 50, the free functioning and operation of lower wing flap 27 to its full efficiency is permitted without interference from the ailerons, which is of particular value under certain flight conditions and maneuvers, such as the "stall" condition where the full effect of the high lift wing is desired and important. However, even where the cellule includes a conventional and not any of the so-called "high lift" types of main lower wing in the combination of the cellule, the upper wing location of the ailerons eliminates interference with the performance of such "low wing" type monoplane wing.

In order to develop increased lift for the wing cellule and attain a lower minimum landing speed, the invention contemplates and includes as a further feature thereof, the utilization of the upper wing ailerons, such as the ailerons 50, to increase the camber of the upper wing base section. This function and result is carried out by rigging or mounting the upper wing mounted ailerons with what may be aptly termed a "droop" to thereby increase the camber of the base section of upper wing 40. Or the aileron operating mechanism (not shown) can be of the type permitting of both normal differential aileron lateral control operation, and/or simultaneous operation of the ailerons 50 in flight, to pull the same down to a lowered wing camber and lift increasing position at the will and under the control of the pilot. In this manner the upper wing 40 can be given more or less incidence and the properties of the upper wing changed with attendant modification or additional performance characteristics.

The wing cellule of the invention by its combination of the monoplane type lower main wing with the high aspect ratio upper wing having small chord with respect to the main lower wing chord, together with the arrangement of external and interplane bracing and trussing for and made possible by such wings, produces a cellule which obtains and retains the advantages of the "low wing" monoplane type of wing and the advantages of the biplane or multiplane type of cellule, while substantially reducing disadvantages of both types. The arrangement and combination of the wings in the cellule enables carrying out that feature of the invention by which the ailerons for the cellule are located on the upper wing and removed from to lower wing to eliminate interference with the performance of such lower, and particularly when the latter is of the "high lift" type utilizing wing flaps or vanes. Also the foregoing results and advantages are obtained through a design and construction of cellule, including the external and interplane bracing and trussing therefor, which is structurally simple, of minimum weight with maximum strength, and aerodynamically efficient.

It is further evident that various changes, variations, modifications, eliminations, additions and substitutions can be resorted to without departing from the spirit and scope of my invention, and hence I do not wish to limit myself to the exact and specific disclosures hereof.

Desiring to protect my invention in the broadest manner legally possible, what I claim, is:

1. In an airplane, a wing cellule comprising a lower wing providing the major wing area of and supporting surface for the airplane, said lower wing of small chord with respect to the chord of the lower wing and including a forward and a rear wing beam forming a fixed structural element thereof, an upper wing having a single wing beam, and inverted V-type struts between and fixedly connecting said wings, said struts attached at the upper ends thereof to the single beam of said upper wing and at the lower, diverged ends thereof to the forward and rear beams, respectively, of said lower wing, said wings including the wing beams thereof, and struts forming fixed structural elements of the cellule.

2. In an airplane, a wing cellule comprising a lower wing providing the major wing area for the airplane, said lower wing including a forward and a rear wing beam, an upper wing of small chord with respect to the chord of the lower wing, said small chord upper wing having a single wing beam located along its trailing portion, inverted V-struts between said wings, the said V struts attached at their upper ends to the single beam of the upper wing and at their lower diverged ends to the forward and rear beams, respectively, of said lower wing, and ailerons pivotally supported from and carried by the single beam of said upper wing, the said ailerons included in the small chord of the upper wing.

3. In an airplane, a wing cellule comprising a lower wing of the "high lift" type embodying an air displacement passage therethrough, said lower wing providing the main wing area of and lift surface for the airplane, an upper wing of high aspect ratio having a small chord with respect to the chord of the lower wing, and ailerons mounted on and carried by said small aspect ratio upper wing in position thereon removed from interference with the operation and performance of said "high lift" lower wing and its air displacement passage.

4. In an airplane, a wing cellule comprising a lower wing of the type having a wing flap for varying the camber of the wing, said lower wing providing the major wing area for the airplane, an upper wing of high aspect ratio having a small chord relative to the chord of the lower wing, and ailerons mounted on and disposed at the rear of the wing in continuation thereof throughout the span of the wing in position removed from interference with the functioning of said lower wing flap and the performance of the lower wing, said ailerons adapted for simultaneous operation to vary the camber of the upper wing.

5. In an airplane, a wing cellule comprising the combination with a lower wing providing the major wing area for the airplane, of an upper wing having an aspect ratio of not less than thirteen (13) based on a span slightly less than the span of the lower wing and a chord not exceeding one-third (⅓) of the chord of the lower wing, said high aspect ratio upper wing disposed above and intermediate the leading and trailing edges of said lower wing, and external trussing and bracing between and connecting said upper and lower wings to form the same into a relatively rigid cellule in which the main lower wing acquires torsional rigidity.

6. In an airplane, a wing cellule comprising a lower wing providing the major wing area of and lift surface for the airplane, said lower wing including a forward and a rear wing beam, an upper wing of high aspect ratio having a small chord relative to the chord of the lower wing, said upper wing provided with a single wing beam, inverted V-type struts between and relatively fixedly connecting said wings, said struts attached at their upper ends to the single beam of said upper wing and attached at their lower diverged ends to the forward and rear beams, respectively, of said lower wing, and bracing between said upper and lower wings disposed in the planes of said V-type struts.

7. In an airplane, a wing cellule including a lower wing of the type having a wing flap for varying the camber of the wing, said lower wing providing the major wing area for the airplane, an upper wing of high aspect ratio having a small chord with respect to the chord of the lower wing, and ailerons mounted on and disposed at the rear of the upper wing in continuation thereof in position removed from interference with the functioning of said lower wing flap and the performance of the lower wing, the said ailerons adapted for simultaneous operation to vary the camber of the upper wing.

Signed at Rochester, New York, this 15th day of Oct., 1929.

RANDOLPH F. HALL.